US007583763B2

(12) United States Patent
Nissani (Nissensohn)

(10) Patent No.: US 7,583,763 B2
(45) Date of Patent: Sep. 1, 2009

(54) MULTI INPUT MULTI OUTPUT WIRELESS COMMUNICATION RECEPTION METHOD AND APPARATUS

(75) Inventor: Daniel Nathan Nissani (Nissensohn), Tel-Aviv (IL)

(73) Assignee: MIMOpro Ltd., RaAnana (IL)

( * ) Notice: Subject to any disclaimer, the term of this patent is extended or adjusted under 35 U.S.C. 154(b) by 109 days.

(21) Appl. No.: 11/491,097

(22) Filed: Jul. 24, 2006

(65) Prior Publication Data
US 2006/0256888 A1 Nov. 16, 2006

Related U.S. Application Data

(63) Continuation-in-part of application No. 11/052,377, filed on Feb. 7, 2005.

(51) Int. Cl.
*H04L 27/06* (2006.01)
(52) U.S. Cl. .................... 375/341; 375/340; 375/316
(58) Field of Classification Search ............ 375/240.18, 375/316, 340–341, 346; 455/7, 12.1, 13.1–13.3, 455/25, 82–83; 342/380–382, 423
See application file for complete search history.

(56) References Cited

U.S. PATENT DOCUMENTS

| 6,097,771 A | 8/2000 | Foschini |
| 6,351,499 B1 | 2/2002 | Paulraj et al. |
| 7,233,634 B1 * | 6/2007 | Hassell Sweatman et al. ............ 375/346 |
| 2003/0236076 A1 * | 12/2003 | Brunel ............ 455/101 |
| 2004/0047426 A1 | 3/2004 | Nissani Nissensohn |

OTHER PUBLICATIONS

Burg et al. "VLSI Implementation of MIMO Detection Using the Sphere Decoding Algorithm", IEEE Journal of Solid-State Circuits, 40(7): 1566-1577, 2005.
Agrell et al. "Closest Point Search in Lattices", IEEE Transactions on Information Theory, 48(8): 2201-2214, 2002.
Gespert et al. "From Theory to Practice: An Overview of MIMO Space-Time Coded Wireless Systems", IEEE Journal on Selected Areas in Communications, 21((3): 281-302, 2003.

* cited by examiner

*Primary Examiner*—Shuwang Liu
*Assistant Examiner*—James M Perez

(57) ABSTRACT

A Multi Input Multi Output (MIMO) Wireless Communication Reception Method and Apparatus are proposed whereby in a 2-way wireless communication system with scattering propagation channels, where several data sub-streams are simultaneously transmitted from a transmitting side to a receiving side, and where no channel information is necessarily available at the transmitting side, excellent Symbol Error Rate performance is a achieved, in some cases quasi-optimal, at a complexity scaling almost quadratically with the number of transmitted sub-streams and independent of the constellation order.

36 Claims, 8 Drawing Sheets

71

72

73

74

MULTI INPUT MULTI OUTPUT WIRELESS COMMUNICATION RECEPTION METHOD AND APPARATUS

RELATED APPLICATION

This application is a continuation-in-part of pending U.S. patent application Ser. No. 11/052,377, filed on Feb. 7, 2005, which application is incorporated herein in its entirety by reference.

STATEMENT REGARDING FEDERALLY SPONSORED RESEARCH OR DEVELOPMENT

Not Applicable

CITED REFERENCES

The following references are cited within this invention description:
[1] Foschini, J. G., 'Wireless communications system having a layered space-time architecture employing multi-element antennas', U.S. Pat. No. 6,097,771
[2] Paulraj, A. J., et al. 'Method and wireless systems using multiple antennas and adaptive control for maximizing a communication parameter', U.S. Pat. No. 6,351,499
[3] Gesbert, D., Shafi, M. et al., 'From Theory to Practice: An Overview of MIMO Space-Time Coded Wireless Systems', IEEE Journal on Selected Areas in Communications, April 2003
[4] Nissani (Nissensohn), D. N, 'Multi Input Multi Output Wireless Communication Method and Apparatus providing Extended Range and Extended Rate across Imperfectly Estimated Channels', U.S. Ser. No. 10/423,447, Apr. 28, 2003
[5] Proakis, J. G., 'Digital Communications', McGraw-Hill, 1995
[6] Van Trees, H., 'Detection, Estimation and Modulation Theory', Wiley, 1968
[7] Lenstra, A. K., Lenstra, H. W., Lovasz, L., 'Factoring Polynomials with Rational Coefficients', Math. Annalen, vol. 261, 1982
[8] Agrell, E., Eriksson, T., et al., 'Closest Point Search in Lattices', IEEE Transactions on Information Theory, August 2002
[9] Duda, R. O., Hart, P. E., 'Pattern Classification and Scene Analysis', Wiley & Sons, 1973
[10] Van Thoai, N. 'Global Optimization Techniques for Solving the General Quadratic Integer Programming Problem', Computational Optimization and Applications, May 1998
[11] Hooke, R., Jeeves, T. A., 'Direct Search solution of numerical and statistical problems', Journal of the Association for Computing Machinery, (8), 1961
[12] Sokolnikoff, I. S., Redheffer, R. M. 'Mathematics of Physics and Modern Engineering', McGraw Hill, 1966
[13] Alamouti, S. M., 'A Simple Transmit Diversity Technique for Wireless Communication', IEEE Journal on Select Areas in Communication, October 1998
[14] Burg, A. et al., 'VLSI Implementation of MIMO Detection Using the Sphere Decoding Algorithm', IEEE Journal of Solid State Circuits, July 2005
[15] Hochwald, B. M., ten Brink, S., 'Achieving Near Capacity on a Multiple Antenna Channel', IEEE Trans. On Communications, March 2003
[16] ElGamal, H., Caire, G, Damen, M. O., 'Lattice Coding and Decoding Achieve the Optimal Diversity-Multiplexing Tradeoff of MIMO Channel', IEEE Transactions on Information Theory, June 2004
[17] Nissani (Nissensohn), D. N., 'About SVD Based MIMO, Imperfect Channel Estimates, and Cross-Talk Interference', to be published in IEEE VTC2006 Fall, September 2006

BACKGROUND OF THE INVENTION

This invention relates in general to Multi Input Multi Output (MIMO) 2-way Wireless Communication Systems. More specifically, this invention is related to MIMO 2-way Wireless Communication Systems where Multiple Antenna Arrays (MAA) are used in the system communication devices, where the propagation Channel Matrix is random, and where Channel State Information is not necessarily available at the Transmitter Side.

During recent years MIMO schemes were proposed for Wireless Communication Systems whereby the system communication devices include MAA and associated transmission and reception circuitry. MIMO systems, when operated in richly scattering channels (such as typical urban and indoor channels in conjunction with properly designed antenna arrays) may exhibit space diversity gain (and thus Extended Range), and, in certain cases, the ability to effectively multiply the overall data rate transferred thru the channel by means of splitting the data stream into several sub-streams, all transmitted simultaneously (and thus achieving Extended Rate). Note that while the term Extended Capacity could be used instead of both Extended Range/Rate (since in Wireless Communication Systems range can be usually traded off by rate and vice-versa) we prefer the latter distinction along this text to distinguish between the 'conventional' diversity gain on one hand, and the ability to transmit several data sub-streams in parallel, which may be achieved only when the 2 communicating sides include an MAA, on the other.

These MIMO schemes may be broadly classified into 2 classes: those that require Channel State Information (CSI) to be available at the Transmitting Side (e.g. [4], [17]) prior to data sub-streams burst transmission and those that do not necessarily require that any CSI be available at the Transmitting Side. This proposed invention deals in particular with MIMO schemes that belong to this second class.

The governing equation of said class of MIMO schemes is $$y_c = H_c x_c + n_c \qquad (1)$$

where, in complex base-band representation, $H_c$ denotes the propagation complex Channel Matrix of $R_c \times L_c$ elements (the 'c' subscript denoting here and elsewhere the complex nature of these entities), with $R_c$ and $L_c$ the number of antenna elements at the (receiving) Right and (transmitting) Left sides respectively, where $x_c$ is the transmitted complex base-band vector, $y_c$ is the received complex base-band vector distorted by the channel $H_c$ and interfered by the channel additive noise $n_c$.

It is assumed in the sequel for purpose of simplicity and without loss of generalization that the Channel Matrix elements are complex Gaussian random variables with zero mean and unit variance ($E[h_{ij}]=0$; $E[|h_{ij}|^2]=1$); that the number of simultaneous complex sub-streams $M_c$ satisfies $M_c \leq \min\{L_c, R_c\}$; that the transmission vector elements $x_{ci}$ are uniformly distributed, derived (as will be shown in the sequel) from a 'typical' constellation (such as QPSK, 16-QAM, 64-QAM, etc.); that the transmission power is constrained to unity ($E[x_c'x_c]=1$, where (.)' denotes the conjugate transpose operation), and that the channel additive noise $n_c$ is a complex Gaussian random variable with zero mean, i.i.d. elements and variance inversely proportional to the Receiver mean Signal to Noise Ratio ($\overline{SNR}$) or mean Symbol Energy to Noise Power Density ($\overline{Es/No}$) ([e.g. [5]), i.e. $E[n_c]=0$, $E[n_{ci}'n_{ci}]=1/\overline{SNR}=2/(M_c \cdot \overline{Es/No})$).

It is further assumed in the sequel that the Channel Matrix $H_c$ is estimated at the Receiving Side prior to data sub-streams reception by some implicit Channel training stage, i.e. $H_{cn} \cong H_c$ where $H_{cn}$ denotes the estimated Channel Matrix and that during the duration of a transmission burst the Channel Matrix $H_c$ undergoes no or small changes.

Several solutions have been proposed to the MIMO equation (1) above. In one such proposed solution the transmitted vector $x_c$ is estimated by application of the Inverse Channel matrix (or, as is usually more appropriate, the pseudo-inverse matrix), followed by a slicing (or decision, or rounding) operation omitted herein for simplicity. This proposed method is also known as the Zero Forcing (ZF) method, is equivalent to the Least Square Estimate (LSE) method, and is considered 'naïve' (due to its relatively poor Symbol Error Rate (SER) vs Es/No performance), but is widely used in literature (as well as herein) as a performance reference scheme. In formal notation $$x_{cZF}=(H_{cn}'H_{cn})^{-1}H_{cn}'y_c \quad (2)$$

where $x_{cZF}$ denotes the estimator of the transmitted sub-streams vector $x_c$. A variant of this ZF method, Minimum Mean Square Estimate (MMSE) with somewhat better performance and higher complexity is used sometimes, and omitted herein for the sake of brevity. The symbol processing complexity of this ZF scheme can be easily shown to be quadratic with the dimension of the transmitted vector $x_c$ and independent of the constellation order (QPSK, 16-QAM, etc.)

Another proposed solution (e.g. [1]) to (1) above is based on an Interference Cancellation scheme whereby sub-streams are usually ordered (according to some quality criterion) and then individually estimated, sliced and cancelled out from the sub-sequent sub-streams. This Interference Cancellation method yields better performance than (2) above, at a significant complexity penalty.

Still other proposed solution (e.g. [2]) to (1) above consists of estimating each sub-stream quality (e.g. by monitoring its SER), sending quality feedback from Receiver Side to Transmitter Side, and individually adapting the Transmitter sub-streams parameters (such as constellation type, channel code, etc.) so as to maximize the system throughput.

Still other proposed solution (e.g. [3]) to (1) above, of special relevance to our proposed invention, is the so called Maximum Likelihood Detection (MLD) scheme whereby the estimated transmitted vector $x_{cMLD}$ is the vector which minimizes the (Euclidean) distance between the received vector $y_c$ and the Channel transformed vector ($H_{cn}x_c$), namely:

$$x_{cMLD}=\arg \min \|y_c-H_{cn}x_{ci}\|^2 \quad (3)$$

where the minimization process takes place upon all the candidate vectors $x_{ci}$ (not to be confused with the transmission vector elements $x_{cI}$). This scheme is known to be optimal in the sense of SER vs. $\overline{Es/No}$ performance, and thus serves as a lower bound reference in literature (as well as herein). However the MLD scheme is also known (again, [3]) to be of prohibitive complexity, the number of candidate vectors $x_{ci}$ exponentially growing with both the dimension of $x_c$ and the order of the symbol constellation; for example, the detection of a transmitted vector with $M_c=4$ sub-streams (i.e. a MIMO system comprising 4 radiating elements MAA on each side) drawn out of 64-QAM constellation, would require $2^{6 \times 4}$ or approximately 16000000 operations/symbol, clearly prohibitive with present art computation devices technology.

Still other proposed solution to (1) above consists of simplifications to (3) above whereby the candidates search set is reduced to a smaller region, typically a 'sphere' of fixed or adaptive radius around the received vector $y_c$. This class of methods is sometimes appropriately named Sphere Decoding (SD for shorthand, e.g. [14]). While providing a lower complexity solution than exhaustive search as per (3) above, their complexity is still prohibitive for many cases of practical interest. In fact no paper seems to have been published describing SD implementations for such relevant configurations as 64-QAM, $M_c=4$.

OBJECTIVES AND ADVANTAGES OF THE INVENTION

The main objective of the present invention is to propose a comprehensive Method and corresponding Apparatus by means of which a MIMO Reception device can achieve excellent (and quasi optimal in many cases) SER vs. $\overline{Es/No}$ performance at a symbol processing computational complexity growing only quadratically with the dimension of x and practically independent of the constellation order.

A major advantage of the proposed invention is its ability to achieve excellent SER vs. $\overline{Es/No}$ performance, quasi-optimal in many cases.

Still other major advantage of the present invention is the low computational complexity implied in the realization of the Reception device.

Still another advantage of this current invention is its relevance to both MIMO systems whereby the channel matrix is time invariant during burst transmission as well as systems whereby the channel matrix undergoes changes during said burst transmission.

Still another advantage of this proposed invention is its capability to generate both 'hard-decision' results as well as 'soft-decision' results, said 'soft-decision' results carrying an output reliability measure and potentially enabling the application of suitable 'soft-decision' channel decoders to further improve link SER vs. $\overline{Es/No}$ performance.

Still another advantage of this invention is its ability to conduct concurrent Space-Time Block Code (STBC, e.g. [13]) decoding, seamlessly integrated within the MIMO detection process.

Still another feature of this proposed invention is its ability to operate with other norms than the Euclidean $l^2$-norm such as the $l^1$-norm or the $l^\infty$-norm thus trading performance for still lesser complexity.

SUMMARY OF THE INVENTION

The proposed invention consists of a MIMO Reception device, said communication device comprising MAA elements, and receiving and processing circuits.

In accordance with the principles of this invention a MIMO Receiver device acquires during an implicit stage, out of the scope of the present invention, and prior to the data sub-streams burst reception process, Channel Matrix information, Symbol Timing, Signal Power Level, Carrier Frequency and any other information typically required by such wireless communication receivers. This information is acquired, or estimated, by means of methods well known to anyone reasonably skilled in the art of communication reception techniques.

In further accordance with the proposed invention the MIMO Receiver device further acquires during or prior to said sub-streams burst reception process, information regarding the number of simultaneously transmitted complex sub-streams $M_c$ and the type of constellation (such as QPSK, 16/64-QAM, etc.) associated with said sub-streams.

Still in accordance with the proposed invention the transmitted vector $x_c$ of (1) above is treated as a point which belongs to a Transmission Lattice Bounded Region (e.g. [8]), said Lattice informally defined as an infinite set of regularly spaced points in a multi-dimensional space, and said Lattice Bounded Region informally defined as a closed continuous region in this space (in typical constellations usually of hyper-cubic shape).

Still in additional accordance with the present invention any noiseless received point $H_c x_c$ of (1) above is perceived as belonging to a Reception Lattice Bounded Region, said Reception Lattice readily calculable from said Transmission Lattice by application of the Channel Matrix $H_c$ as will be clarified in the sequel.

Still in accordance with this invention, the MIMO reception process incurs the attempt of calculation of the MLD solution point $x_{cMLD}$ of (3) above, that is a point which belongs to the Reception Lattice, which resides closest (in a Euclidean distance or other suitable sense) to the Received Vector $y_c$ of (1) and which is confined to the appropriate Lattice Bounded Region.

In further accordance with the proposed invention a transmitted vector Reception process includes: the calculation of a Reception Initial Lattice Point; an iterative Lattice Descent Stage during which, starting from said Reception Initial Lattice Point a possible descent is executed to sub-sequent Reception Lattice Points each calculated to reside at a smaller distance from the received vector $y_c$ than its previous one, said Descent Stage terminated at a Descent Lattice Point for which no closer Reception Lattice Point to the Received Vector $y_c$ is found (i.e. a minimal point); and an occasional and rarely applied Outlier Stage during which, in cases whereby the Lattice Descent point achieved by said Descent Stage is found to reside out of the Reception Lattice said Bounded Region, an Outlier Stage Lattice Point is calculated by any of a variety of means to be described in the sequel, so that said resulting Outlier Stage Lattice Point is found to belong to said Lattice Bounded Region and so that its distance from said received vector $y_c$ is (hopefully) smaller than any that of any other Lattice Point belonging to said Lattice Bounded Region.

DETAILED DESCRIPTION OF THE INVENTION

Figure 1:
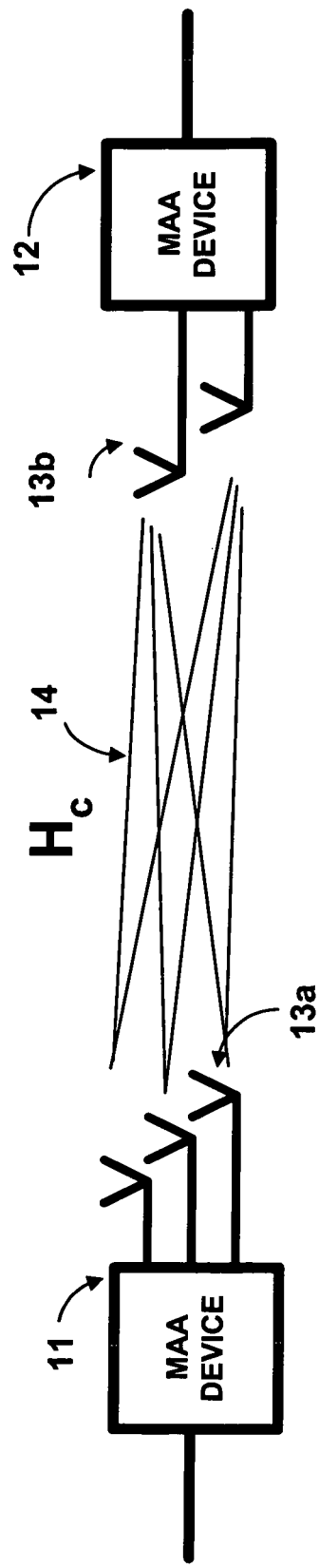
FIG. 1 describes a deployment of a MIMO Transmitter device and a MIMO Receiver device.

A typical instance of a Wireless MIMO Communication System is shown in FIG. 1. Such a System should include at least 2 communication devices, such as 11 and 12, at least one of which should include a MAA such as those figuratively represented by 13a and 13b.

Between said pair of the MIMO System devices a propagation Channel, such as 14, characterizing the propagation effects during signal transmission from 11 to 12 as shown in FIG. 1, may be defined.

The wireless Channel 14 between the specified devices 11 and 12 of FIG. 1, in indoor and urban MIMO Systems deployments, may typically be described by a complex random $R_c \times L_c$ matrix $H_c$, where $R_c$ denotes the number of antennas in the Right, say the Receiving, side, MAA device 12, $L_c$ denotes the number of antennas in the Left, say the Transmitting, side, MAA device 11, and each element $h_{ij}$ in row i and column j of $H_c$ defines the (complex base-band) response between reception antenna i of 12 and transmission antenna j of 11.

In an indoor or urban wireless deployment, due to the scattering nature of the propagation Channel 14, the elements of the channel matrix $H_c$ will typically, but not necessarily, be weakly mutually correlated random variables, provided that the MAA elements are properly spaced and designed.

In a typical deployment of the proposed invention the Channel Matrix 14 will experience no or negligible variation, or small variation since the time the Channel estimate $H_{cn}$ is made available at the Receiving Side prior to transmission burst start, and till the end of the transmission burst period.

It will also generally be assumed along this invention description that immediately prior to the data sub-streams transmission, the processes of Signal Power Level, Carrier Frequency and Symbol Timing information estimation and extraction have been completed so that this information is known, down to reasonable accuracy, to the Receiving Side communication device 12 of FIG. 1.

It will be convenient (but not essential to the nature of this invention) in the sequel to adopt an all-real number representation of all complex number entities involved; this can be easily achieved by replacing any complex matrix, such as $H_c$ by an all-real H $$H = \begin{bmatrix} \mathrm{re}H_c & -\mathrm{im}H_c \\ \mathrm{im}H_c & \mathrm{re}H_c \end{bmatrix} \quad (4)$$

of appropriate dimension, and any complex vector, such as $x_c$ by $$x = \begin{bmatrix} \mathrm{re}(x_c) \\ \mathrm{im}(x_c) \end{bmatrix} \quad (5)$$

and similarly for $y_c$ and $n_c$, so that our MIMO system governing equation (1) and our optimal (MLD) detection equation (3) will become, in equivalent all-real notation $$y = Hx + n \quad (6)$$

and $$x_{MLD} = \arg\min \|y - H_n x_i\|^2 \quad (7)$$

respectively, where the subscript 'c' has been omitted to denote an all-real representation. The inverse transformation process, from all-real to complex representation is also readily achieved and omitted herein for the sake of brevity. It can be also readily observed that, applying this all-real notation, the number of all-real data sub-streams is $M=2 \cdot M_c$, and, similarly $L=2 \cdot L_c$ and $R=2 \cdot R_c$.

Figure 2:
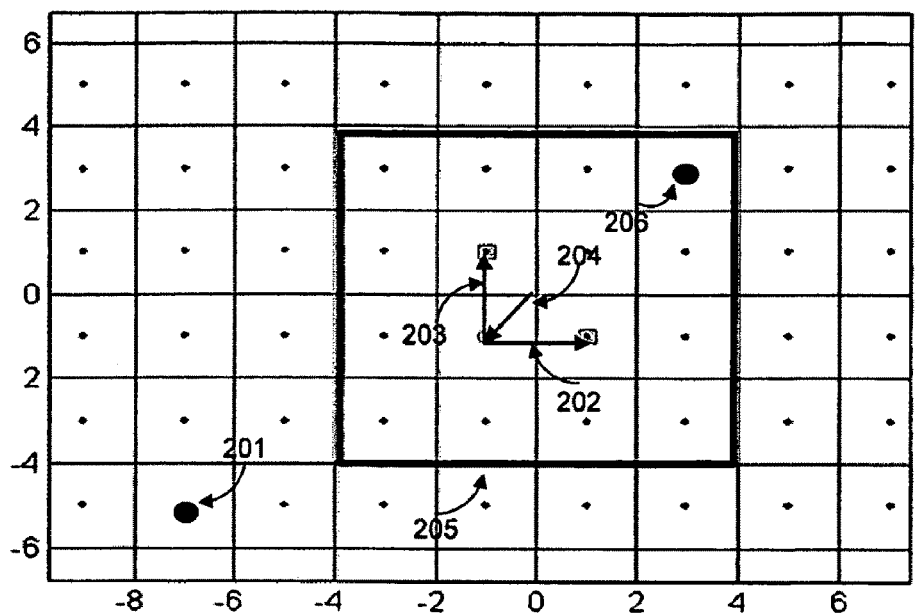
FIG. 2 provides some characterizations of Lattices and Lattice related entities relevant to the proposed invention.
Figure 2:
Figure 2:
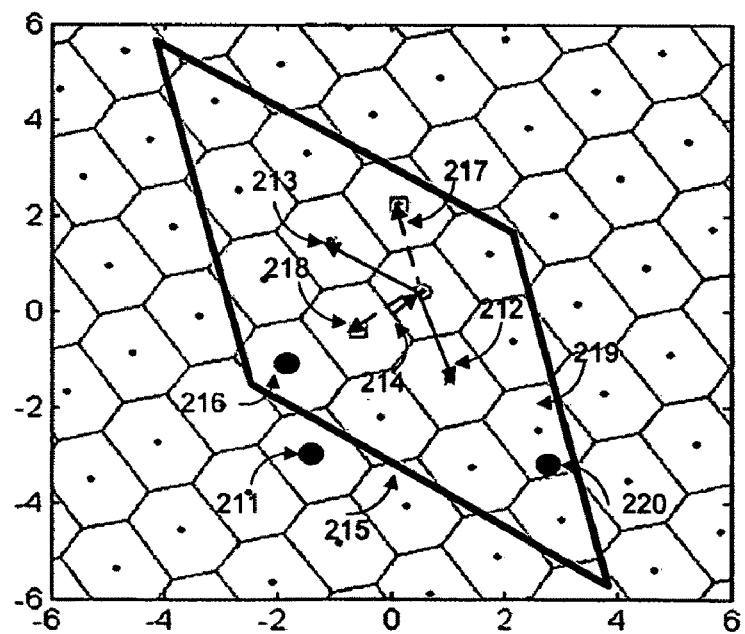

FIG. 2 presents Lattice related entities essential to the exposition of the present invention. A Transmission Lattice suitable for the description of a simple (M=) 2 sub-streams, 4-PAM (Pulse Amplitude Modulation) constellation is depicted in 20 of FIG. 2. Generalization to M>2 sub-streams and to more common complex constellations such as QPSK, 16-QAM, 64-QAM, etc., is straightforward and could be easily devised by anyone reasonably skilled in the art. Such Transmission Lattices are essentially an infinite set of regularly spaced points in a multi-dimensional space. Any Lattice Point x 201 can be conveniently described by means of a linear combination of Basis column Vectors $a_1$ 202 and $a_2$ 203, namely $$s = a_0 + m_1 a_1 + m_2 a_2 = a_0 + Am \qquad (8)$$

where m=(m1 m2)' is any integer vector, $A=[a_1 a_2]$ is a Lattice Generator Matrix and the Lattice Basis Vectors 202 and 203 are $a_1=(2\ 0)'$ and $a_2=(0\ 2)'$, and where the inconsequential Translation Vector $a_0=(-1\ -1)'$ 204 is added for convenience.

In a typical MIMO communication system transmission constellations are confined to a Bounded Region 205 of a Transmission Lattice 20, such confinement achieved by constraining the integers vector m so that $$m_{min} \leq m_i \leq m_{max} \qquad (9)$$

which in our simple depicted 4-PAM example of 20 take the values $m_{min}=-1$ and $m_{max}=2$. Other constellations, such as QPSK, 64-QAM, etc. result in different values for the constraint (9). A constellation vector s 206 can then be selected for transmission, subject to equation (8) and to constraint (9), and then be used to generate the transmission vector $$x = gQs \qquad (10)$$

where g is a power normalization scalar, dependent on the number of sub-streams M and on the transmission constellation, applied so that the transmitted vector x maintains unity power as mentioned above, and where Q is a unitary matrix (i.e. Q'Q=I where I is the Identity) which matches the dimension M of the transmitted symbol s to the dimension L of the left hand side of the Channel thus enabling transmission of an arbitrary number M of data sub-streams subject to the constraint $M \leq \min\{L, R\}$ as mentioned above (Q is not required and may be omitted when M=L).

As can be observed, the Reception Lattice 21 of FIG. 2 is affected by the scaling and rotation effects caused by the random Channel Matrix H and the unitary matrix Q on the Transmission Lattice 20 of same Figure. Any point p 211 of the Reception Lattice 21 is expressed by $$p = g(HQa_0 + HQAm) = g(b_0 + Bm) \qquad (11)$$

where B=HQA is the Reception Lattice Generator Matrix composed of Reception Basis Vectors $b_1$ 212 and $b_2$ 213, and $b_0$=HQ$a_0$ is the Reception rotated-scaled Translation Vector 214.

It can be further observed from 21 of FIG. 2 that the Basis Vectors $b_1$ 212 and $b_2$ 213 are no more orthogonal (in contrast to $a_1$ 202 and $a_2$ 203 of 20, which are shown to be orthogonal by virtue of the use of popular constellations), and that the Reception Bounded Region 215 of the Reception Lattice 21 has been also scaled and rotated although still subject to same constraint (9) above so that $m_{min} \leq m_i \leq m_{max}$ for the Reception Lattice Bounded Region as well.

It should be still further observed that the transmitted constellation vector 206 of 20 described by its integer vector m (aside of its Lattice Generator A) has been transformed in the (noiseless, at this point of the invention exposition) received constellation vector 216 of 21, residing inside the Reception Bounded Region and preserving the same integer descriptive vector m.

The Reception Lattice 21 can be separated into disjoint decision regions (commonly called Voronoi regions), each decision region including all the (real) points that are closer (in a Euclidean distance sense) to a specified Lattice Point than to any other Lattice Point, one of such Voronoi regions indicated by 219. It is the main function of an optimal (MLD) MIMO receiver to associate any real and noisy received vector y such as 220 of 21 to the closest Reception Lattice Point, that is to the Lattice Point at the 'center' of the Voronoi region to which said Received Vector 220 belongs to.

It should be noted that the scaled-rotated Reception Lattice 21 can be easily 'de-rotated' by means of application of the fore-mentioned Inverse Channel transformation of (2) above. However, this 'de-rotation' correlates the (originally i.i.d.) elements of the additive noise vector n, distorting the de-rotated Lattice MLD detection metrics; while in the Reception Lattice 21 the MLD detection metrics is the plain geometric Euclidean metrics the de-rotated Lattice MLD detector metrics is a non-Euclidean, so called Mahalanobis, distance (e.g. [9]). Both representations are equivalent and the use of one or the other is not of essence to the proposed invention. The 'rotated' Reception Lattice 21 (with its associated Euclidean metrics) will be used in the course of this invention exposition. It is the failure to recognize the properties and detection requirements of this Mahalonabis metrics that deteriorates the fore-mentioned ZF detector so much.

In the context of a preferred embodiment of the proposed invention it will be convenient to describe the Reception Lattice 21 by means of column Basis Vectors $c_1$ 217 and $c_2$ 218 which are more mutually orthogonal to each other than the original Reception Lattice Basis Vectors $b_1$ 212 and $b_2$ 213 as described by the Reception Lattice Generator Matrix B as defined above. Such Basis Vectors usually exist, and are commonly called Reduced Basis Vectors; computationally efficient algorithms for the calculation of such Reduced Basis Vectors have been developed, including the so called LLL Lattice Basis Reduction Algorithm (e.g. [7]). Since said Reduced Basis Vectors depend only on the Channel Matrix H (and not on the transmitted symbol x) they can be calculated only once (per data burst transmission) at a Channel Processing stage.

Since both the original Reception Lattice Generator Matrix B and the Reduced Reception Lattice Generator Matrix $C=(c_1 c_2)$ describe the same Lattice, then any Lattice Point p 211 can be equivalently be expressed by $$p = g(b_0 + Bm) = g(b_0 + Ck) \qquad (12)$$

where k is an integer column vector, and from which the following significant transformations are immediately derived:

$$m = (B^{-1}C)k = Wk \qquad (13)$$

and $$k = (C^{-1}B)m = Vm \qquad (14)$$

where $W=(B^{-1}C)$ and $V=(C^{-1}B)$ can be shown to be integer matrices.

It is a main idea of this proposed invention to solve the MIMO detection problem by means of the solution of an integer (Lattice) Direct Search (e.g. [11]) optimization problem. This solution incurs the selection of an Initial Lattice Point, followed by a Lattice Descent Stage whereby subsequent 'adjacent' Lattice Points are selected if their (Euclidean) distance from the Received Vector y is smaller than the distance of the previous Lattice Point from said Received Vector, and whereby said Descent Stage is terminated whenever the attempt to identify a closer Lattice Point fails, thereby indicating the probable achievement of a minimum distance Lattice Point.

It is a second main idea of the present invention to solve the MIMO detection problem by means of execution of an Outlier Stage during the occasional (but nevertheless non-negligible) cases whereby said Lattice Descent Minimal Point, the said result of said Lattice Descent Stage, is found to reside out of the Reception Lattice Bounded Region 215, such as 211, both of 21. During said Outlier Stage a Lattice Point residing inside the Bounded Region 215 of 21 is subsequently calculated so that its distance from the Received Vector y is the smallest of all other Lattice Points belonging to said Bounded Region 215. This Outlier Stage can be implemented by a variety of computationally efficient techniques as will be further described below.

Figure 3:
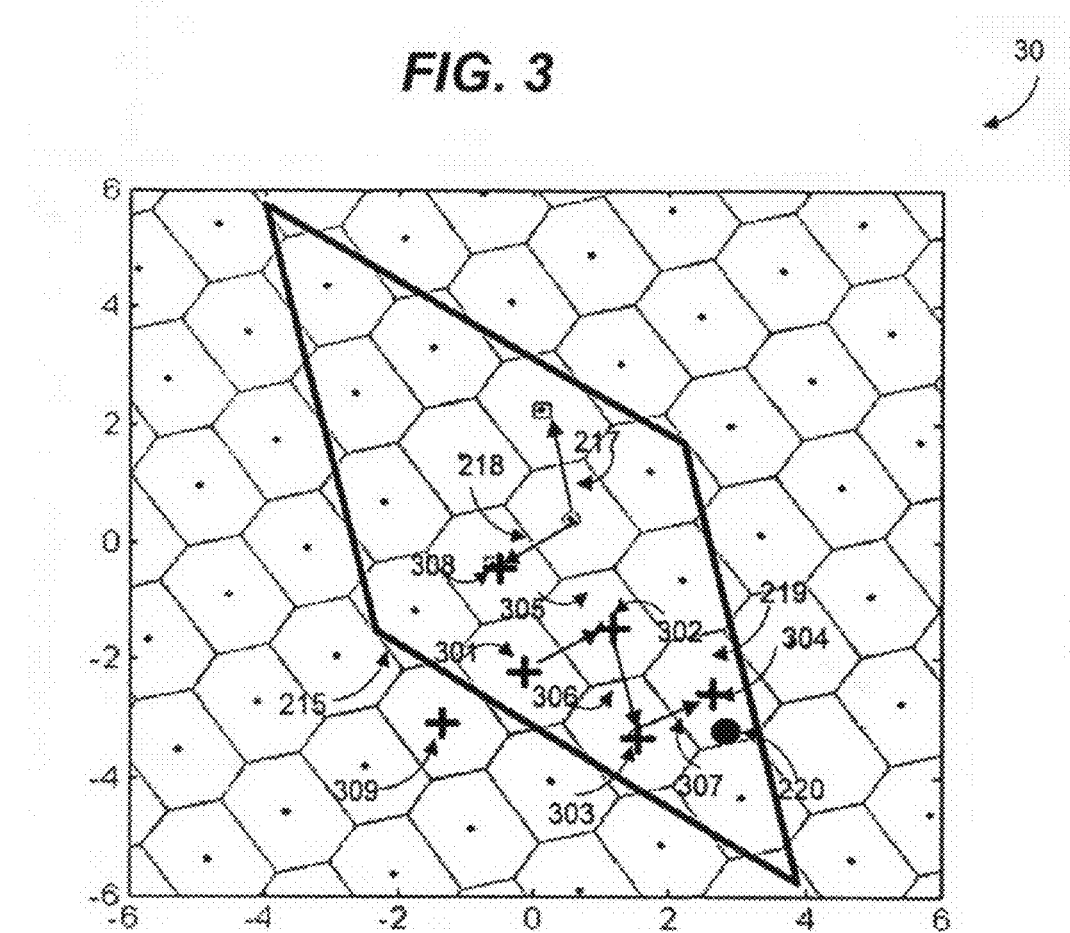
FIG. 3 shows a Reception Lattice and the associated entities, essential for the exposition of the fore mentioned Lattice Descent Stage and to the fore-mentioned Lattice Outlier Stage.
Figure 3:
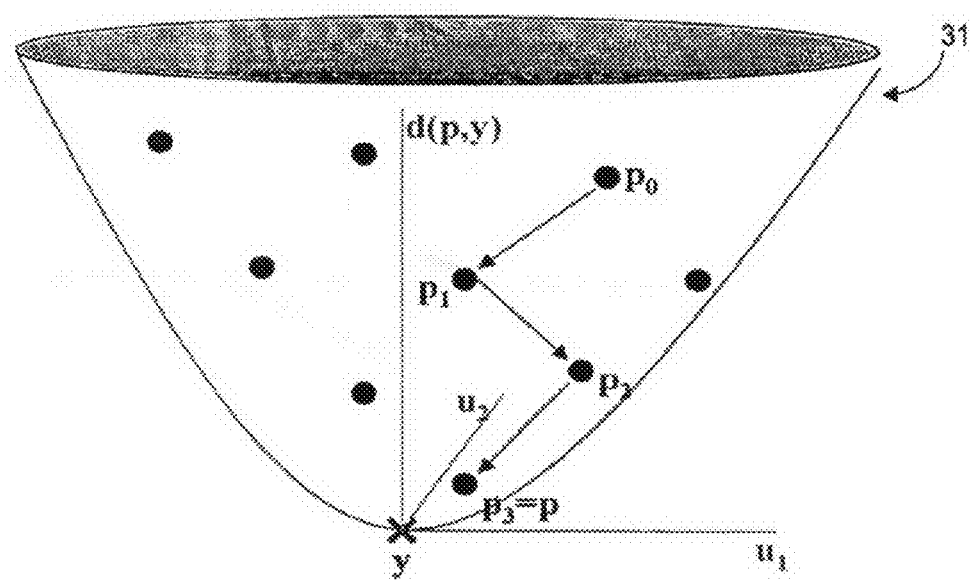

In 30 of FIG. 3 the Reception Lattice entities, essential for the exposition of the fore mentioned Lattice Descent Stage, one of said main ideas of the proposed invention, are depicted. Several entities, introduced in 21 of FIG. 2 are repeated herein, for the sake of clarity, including the Reduced Basis Vectors 217 and 218 (associated with a preferred embodiment of the present invention), the Reception Bounded Region 215, a Received Vector y (as per (6) above) 220, and its associated Voronoi region 219. The MLD result after reception of said point y 220 is the Reception Lattice Point 304, at the 'center' of the Voronoi region 219.

In accordance with a possible embodiment of the proposed invention, it is assumed that an arbitrary Initial Lattice Point, such as 301 of 30 has been selected at the initiation of the Descent Stage. This Initial Lattice Point 301 is the current hypothetical result of the Lattice Descent Stage.

In further accordance with a possible embodiment of this invention the distance between said Initial Lattice Point 301 and the Received Vector 220 is calculated. Following said calculation, candidate Lattice Points, each such candidate derived from the previous (Initial in the first step) Lattice Point by incrementing (or decrementing) the value of a single coordinate $k_i$ of the fore mentioned descriptive vector k by a single unit in each of both (positive and negative) directions of the (Reduced) Basis Vectors $c_1$ and $c_2$, are calculated. Examples of such candidate Lattice Points, 'adjacent' to the Initial Lattice Point 301 in the described way, are 308, 309, and 302 of 30. In general, according to a preferred embodiment of this proposed invention, the number of candidate Lattice Points at each iteration step is 2M. For example, in the depicted simple case of a (real, M=2) M-dimensional Lattice, carrying M (real) data sub-streams and spanned by M (Reduced) Basis Vectors, 2M (=4 in this case) such candidates exist.

In a possible embodiment of this invention the distances between each of these 2M candidates (of which 308, 309, and 302 are marked in 30) and the Received Vector 220 are calculated, and a candidate Lattice Point is selected, 302 in this example, with the smallest distance (of all considered candidates) from the Received Vector 220.

The Lattice Point 302 becomes effectively a new hypothetical result of the Lattice Descent Stage and the process is repeated, sequentially selecting, in our example, Lattice Points 303 and 304 corresponding to the unit direction vectors 306 and 307 of 30. The Lattice Descent Stage is then terminated, since, following arrival to 304 no unit direction vector yields a candidate Lattice Point with smaller distance to 220 than 304 itself, indicating the arrival to a Lattice Descent Minimal Point.

For the sake of clear and intuitive exposition this Lattice Descent process, key concept in the proposed invention, is figuratively and self-explanatorily described again in 31 of FIG. 3; detailed description is omitted for the sake of brevity.

It should be now clear and apparent to the reader that, as opposed to prior art search methods where the search for the minimum distance point takes the form of (hyper-) volume search, or tree search, the arrival to the minimal point in our proposed invention is simply a progressive 'linear' process whereby we 'descend' across the Reception Lattice Points till a (prospective) minimal distance point is achieved.

Said Lattice Descent Minimal Point 304 can be a true Minimum Point, i.e. a point such that no other Lattice Point is closer to the Received Vector y than said Minimum Point, or it may turn out to be a false Minimum Point, that is a point that, because of the properties of the direction vectors utilized during said Descent Stage (for example the relatively non-orthogonal original Basis Vectors $b_1$ and $b_2$), results in termination of said Descent Stage in some Lattice Point other than the true Minimum Point.

In a preferred embodiment of the present invention said specific set of selected direction-vectors is a Reduced Basis Vector set such as 217 and 218 of 30 as defined above, i.e. a minimal set of relatively short and orthogonal vectors which span the Reception Lattice, thus reducing the probability of false Minimum Points as described.

In still other embodiments of the proposed invention, the original (non-reduced) Basis Vectors $b_1$ and $b_2$ constituent of the Reception Lattice Generator Matrix B can be used.

In still other embodiments of this invention other sets of vectors, which span the Lattice but do not necessarily constitute a basis (i.e. are not necessarily a minimal set of vectors) can be used. For example the union set of B and C basis vectors could be employed.

In still other embodiments of this proposed invention the fore-mentioned Lattice Descent Stage is implemented in a constrained form, namely whereby a new candidate Lattice Point is selected if its distance from the Received Vector y is smaller than that of all other candidates as described in the paragraphs above, but with the additional constraint that it resides within the Bounded Region 215, said method variant dubbed Lattice Constrained Descent. It should be noted that such Lattice Constrained Descent is also proposed later in the sequel in the context of embodiments of the Outlier Stage.

Figure 4:
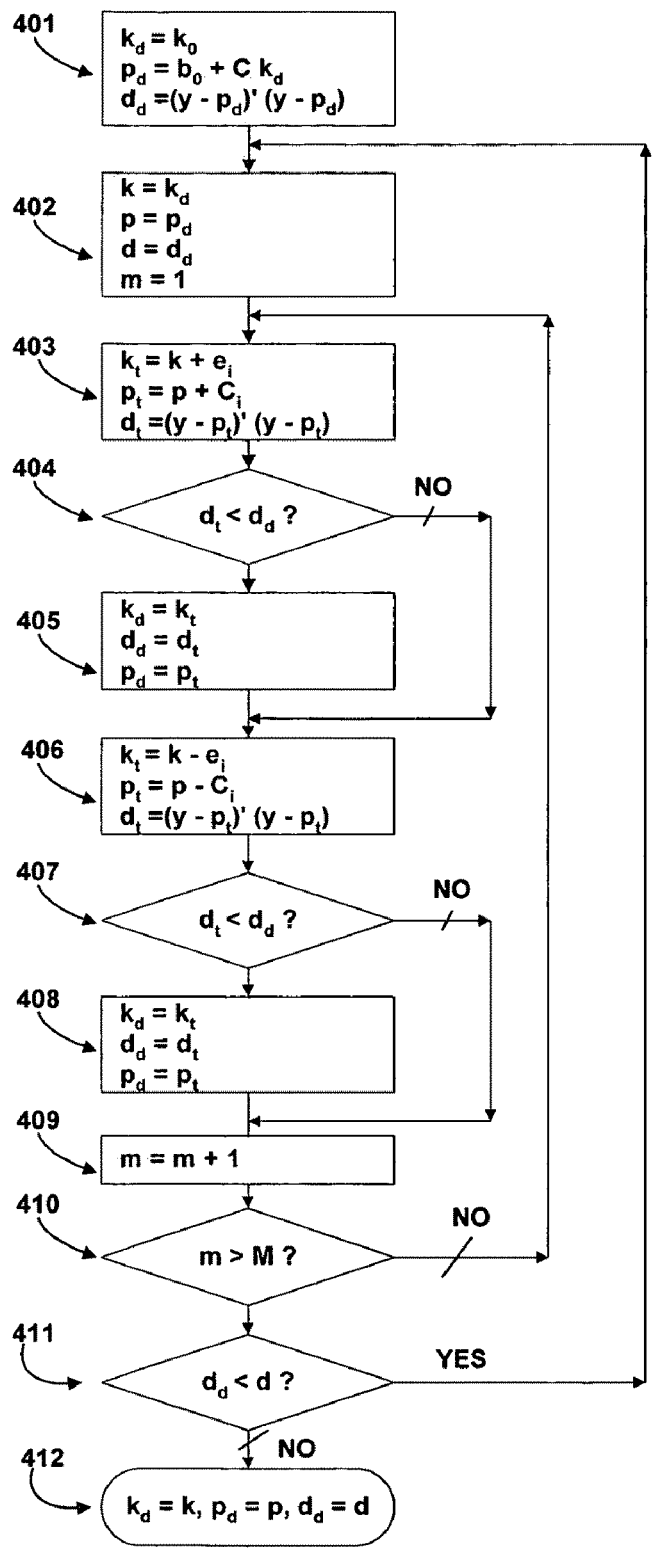
FIG. 4 depicts a simplified Flowchart of the Lattice Descent Stage processing.

While it is possible, according to some embodiments of the proposed invention, to conduct explicit candidate Lattice Points calculation at each step (with its associated quadratic complexity) as depicted above, a more computationally efficient calculation and selection of new candidate Lattice Points which requires only linear complexity with M will be described in the next paragraphs, in the context of a simplified Flowchart of the Lattice Descent Stage processing as depicted in FIG. 4. In such a preferred embodiment of the proposed invention the overall Lattice Descent Stage complexity is merely quadratic in M and independent of the constellation order.

The explicit expression of an Initial Lattice Point $p_0$ such as 301 of FIG. 3, as per (12) above and after neglecting for simplicity the scaling factor g, is $p_0=b_0+Ck_0$, the calculation of which can be readily seen to be of quadratic complexity with M; this explicit calculation is carried out only once (per processed input symbol) at the entry point to the fore-mentioned Lattice Descent Stage as is shown in 401 of FIG. 4. This Initial Lattice Point $p_0$ serves as the first Lattice Point candidate of said Lattice Descent Stage so that $p_d=p_0$ as shown in 401 of FIG. 4.

The Euclidean (squared) distance d(p,y) between a Received Vector y (such as 220 of 30) and an arbitrary Lattice Point p=$b_0$+Ck (such as 301 of 30) is readily expressed as $$d(p,y)=(y-p)'(y-p) \qquad (15)$$

the calculation complexity of which is linear with M; this distance calculation is carried out once at the entry point of the Lattice Descent Stage, as shown in 401 of FIG. 4 and also once for each new candidate Lattice Point $p_t$ during said Lattice Descent Stage iterations as shown in 403 and 406 of FIG. 4, the number of candidates at each iteration being 2 M as explained above.

A unit column vector $e_i$ is next defined so that it contains zeroes in all its elements except the 'i' element which is valued +1 or −1 alternatively, i.e. $e_i$=(0 0 . . . $^+\!/\!_-$1 0 . . . 0)'. An adjacent candidate Lattice Point pt ('adjacent' to our previous point p) is then $$p_t=C(k+e_i)=p+Ce_i=p+/-C_i \qquad (16)$$

which is simply the sum (or subtraction) of p and the 'i'-th column of C (denoted by $C_i$). This is again shown in 403 and 406 of FIG. 4. The calculation complexity of (16) above, also carried out once for each new candidate is then merely linear with M. Moreover, its calculation consists of addition (ADD) operations significantly simpler to implement in hardware or software than multiplication-accumulation (MAC) operations.

In a preferred embodiment of this invention, new Lattice Point candidates $p_t$ as defined by (16) are calculated at each iteration for each of the 2M (as directed by 409 and 410 of FIG. 4) possible vector-directions $e_i$, and the next Lattice Descent Stage hypothetical result $p_d$ is selected, as shown in 404, 405, 407 and 408, such that its corresponding distance $d(p_d,y)$ as calculated by (15) above is the smallest of all candidates and smaller than the distance d(p,y). The Descent Stage ends then, once no new candidate $p_d$ satisfies $d(p_d,y)<d(p,y)$ as is shown in 411 of FIG. 4, this being indicative of the arrival to a minimum distance Lattice Point such as 304 of 30.

In other possible embodiments of the proposed invention the Euclidean metrics as described by (15) above, suggested herein for the implementation of the fore-mentioned Lattice Descent Stage as well as for some of the proposed implementations of the Outlier Stage (as will be described below) can be replaced by other metrics based on well known norms such as the $l^1$-norm or the $l^\infty$-norm, which are known to yield sub-optimal detection results (e.g. [14]) but which are of lower complexity than the (optimal) Euclidean $l^2$-norm.

It should be evident by now from the previous description that the complexity of the proposed MIMO detection method depends also on the number of said Descent Stage iterations which in turn depends on the proper selection of an Initial Lattice Point 301 of 30. The closer this Initial Lattice Point is selected to the MLD optimal solution, the less iteration steps are required in order for the previously described Lattice Descent Stage to converge to that solution. In the context of a preferred embodiment of this proposed invention the Initial Lattice Point is the Rounded Parallelepiped Projection of the Received Vector y on each of the Lattice Basis Vectors as described below.

Figure 5:
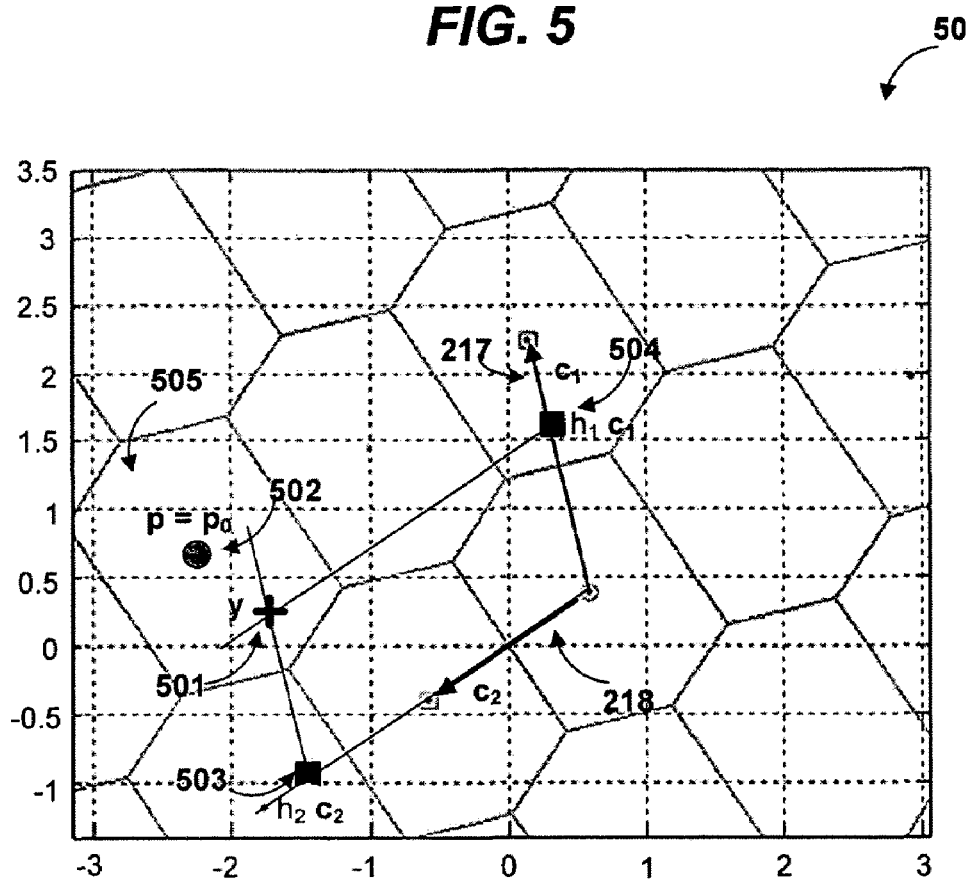
FIG. 5 presents Reception Lattice views related to the calculation of a Reception Initial Lattice Point.

FIG. 5 depicts a zoomed-in view of the Reception Lattice 50 in the context of the selection of an Initial Lattice Point in a preferred embodiment of this invention. The Reduced Basis Vectors $c_1$ 217 and $C_2$ 218, i.e. the column vectors of the Reception Lattice Generator Matrix C, are repeated in this drawing in the context of the Rounded Parallelepiped Projection concept introduced herein. We assume the reception of a vector y 501. Since this vector 501 belongs to the Voronoi region 505 the optimal MLD detector will decide that the transmitted symbol is the Lattice Point 502 which can be easily seen to be described by k=(1 2)'.

In order to calculate the Rounded Parallelepiped Projection of Received Vector 501 a dimension, say $c_1$, is first selected and a hyper-plane spanned by all the other dimensions (only $c_2$ in our simple example), and passing through the Received Vector 501 is expressed by $(y+h_2c_2)$ where $h_2$ is a (not necessarily integer) scalar parameter.

We now proceed to calculate the intersection of said hyper-plane and the selected dimension-vector 217 $c_1$. All points in this direction are expressed by $(b_0+h_1c_1)$ where $h_1$ is, again a (not necessarily integer) scalar parameter. Hence the intersection between said hyper-plane and said dimension-vector is expressed by $(y+h_2c_2)=(b_0+h_1c_1)$ which is readily solved for $h=(-h_1,h_2)'$ to yield $$h=C^{-1}(b_0-y) \qquad (17)$$

This process is repeated for the other dimensions (only $C_2$ 218 in our simple case) to find each of the other intersection points. It should be noted that, in practice, (17) needs to be resolved only once, and the required parameter is extracted by negating the corresponding scalar parameter $h_i$.

The Rounded Parallelepiped Projection of our Received Vector y 501, i.e. the Initial Lattice Point $k_0$ is then $$k_0=-\text{round}(h) \qquad (18)$$

where 'round' is the rounding (to the nearest integer) operator.

By inspection of the geometry of 50 of FIG. 5 it can be seen that the Rounded Parallelepiped Projection process yields in this specific case the Lattice Point $k_0$=(1 2)' identical to the MLD detected Lattice Point 502. Although this is the (happy) case in the great majority of instances, there are cases (not shown in FIG. 5) whereby the resulting Rounded Parallelepiped Projection $k_0$, differs from the MLD solution (but is usually very close to it). The fore-mentioned Lattice Descent Stage attempts (usually successfully) to finally converge to said MLD solution in these cases.

In a preferred embodiment of our proposed invention the Initial Lattice Point is the result of the Rounded Parallelepiped Projection computation (18) as described above.

In other embodiment of the present invention said Initial Lattice Point can be the rounded Inverse Channel or ZF solution (2) as described above.

In still other embodiment of the proposed invention said Initial Lattice Point can be the rounded result of some other estimator such as the MMSE solution as mentioned above.

In still other embodiment of the proposed invention said Initial Lattice Point can be the rounded orthogonal projection of the Received Vector 501 onto each of the direction-vectors.

In still other embodiment of the proposed invention said Initial Lattice Point can be a fixed Lattice Point, such as the Lattice origin.

We refer again to 30 of FIG. 3 in order to describe aspects and embodiments of the fore-mentioned Outlier Stage of this proposed invention. As mentioned above the result of the Lattice Descent Stage may be a Lattice Point residing out of the Reception Bounded Region 215. Such an example of an 'Outlying' Lattice Point 309 is shown in 30 of FIG. 3. As it turns out this erroneous Descent Lattice Point decision may happen occasionally, but still with non-negligible probability, depending on the specific Reception Lattice (i.e. on the Channel Matrix H), on the selected Constellation type (e.g. QPSK, 16-QAM, etc.) and on the mean Reception $\overline{SNR}$. Detection of such a point as 309 as the hypothetically transmitted Lattice Point is obviously incorrect since transmitted Lattice Points are confined to the Bounded Region 215 by virtue of the inequality constraint (9) above.

The correct Maximum Likelihood Decision in such cases would be a Lattice Point closest to the Received Vector y but residing within the Bounded Region 215. Such a point, in our example, would be 301. Several Lattice Outlier methods can be applied, with varying degrees of SER performance and complexity as will be presently described.

It should be noted herein that in the context of the present invention, due to the typically low frequency of occurrence of these Outlying Lattice Points, complexity of the Outlier Stage has relatively small impact on the average complexity (i.e. average number of operations per symbol) of a MIMO Receiver device.

In a preferred embodiment of the Lattice Outlier Stage of this proposed invention a processing similar to the Lattice Descent Stage as described above is executed, namely, a distance from the Received Vector y to a selected Initial Lattice Point is calculated by means of (15) as above, said Initial Lattice Point selected so that it resides inside said Lattice Bounded Region 215; then subsequent candidate Lattice Points are calculated by means of (16) above; then their distances from said Received Vector y is evaluated by means of (15) above and compared with that of the current 'best' Lattice Point, and a new Lattice Point is selected if its distance from the Received Vector y is smaller than that of the current Lattice Point and if it resides inside the Lattice Bounded Region 215. We denote this Outlier Stage method by Lattice Constrained Descent. The Flowchart for this Outlier Stage embodiment is very similar to the depicted in FIG. 4 and omitted herein for the sake of brevity.

In the context of a possible embodiment of the Lattice Outlier Stage of the present invention convenient metrics functions describing the distance between an Outlying Lattice Point, such as 309, and the Lattice Bounded Region 215 (denoted by R below) can be defined. For any Lattice Point $p=g(b_0+Bm)==g(b_0+Ck)$ as defined by (12) above one possible simple metrics function could be $$d_i(p, R) = \begin{cases} |m_i - m_{\min}|, & m_i < m_{\min} \\ 0, & m_{\min} \le m_i \le m_{\max} \\ |m_i - m_{\max}|, & m_i > m_{\max} \end{cases} \quad (19a)$$

and $$d(p, R) = \sum d_i(p,) \quad (19b)$$

and $$d(p,R)=\Sigma d_i(p,R) \quad (19b)$$

Another possible convenient metrics function could be $$d(p,R)=\max d_i(p,R) \quad (19c)$$

with $d_i(p,R)$ defined by (19a) above.

Other convenient metrics functions suitable to describe the distance between a Lattice Point and an associated Bounded Region R can be devised.

In a possible embodiment of the proposed invention, for resulting Lattice Descent Stage Points such as 309 found to reside outside the Bounded Region 215, a Lattice Outlier Stage is initiated. In further accordance with a possible embodiment of the present invention, starting from said point 309, different possible directions are generated by single coordinate increments (or decrements) of Lattice vectors (in a similar fashion to the Lattice Descent Stage method as described above); for each such resulting new candidate Lattice Point the metrics function (as per (19b) or (19c) above) is evaluated and a Lattice Point is selected based on the largest decrease (or the smallest increase) in d(p,R). The resulting Lattice Point is the starting point for a new iteration whereby each vector coordinate is incremented (decremented) and its metrics function is evaluated. This iterative process is terminated once a Lattice Point is generated for which d(p,R)=0. The process may be also aborted if, after a predetermined number of iterations, no Lattice Point for which d(p,R)=0 is found. The resulting Lattice Point is our Outlier Stage result and our final Vector-Symbol Decision.

In accordance with another possible embodiment of the proposed invention the Lattice Outlier Stage is resolved by solving the Integer Quadratic Programming problem $$\min(Bm+b_0-y)'(Bm+b_0-y) \quad (20a)$$

subject to $$m_{min} \le m_i \le m_{max} \quad (20b)$$

or, similarly $$\min(Ck+b_0-y)'(Ck+b_0-y) \quad (20c)$$

subject to $$m_{min} \le (Wk)_1 \le m_{max} \quad (20d)$$

where the minimization is executed over m (or equivalently, k), and where the functional (20a) (or (20c)) above defines the Euclidean distance between a general Lattice Point and the Received Point y. Integer Quadratic Programming constrained optimization problems are considered classic optimization problems and can be solved by a variety of methods such as (but not limited to) the so called Branch and Bound method by those reasonably skilled in the art (e.g. [10]).

In another preferred embodiment of the Outlier Stage of this present invention a combination of two or more Outlier Stage methods as described above can be applied at each (infrequent) Outlier event and the Lattice Point result residing inside the Bounded Region and at the smallest distance from the Received Vector y is selected.

In some possible embodiments of the proposed invention it could be desirable or required to provide a so-called 'soft-decision' output indicating the level of reliability that can be assumed for the current decision. Such 'soft decision' output has proved to be very effective in improving link performance (i.e. SER vs. $\overline{Es/No}$) in conjunction with channel coding schemes, such as convolutional codes or turbo codes. Depending on the class of channel coding used, said soft decision information can be referred to the detected Vector (i.e. to our Outlier final Lattice Point decision $p_a=Ck_a$); or to the detected Symbol (i.e. to $p_{ai}=(Ck_a)_i$, i=1,2, ... M; or to the detected Bit $b_k(p_{ai})$ where $b_k$ is calculated from $p_{ai}$ by means of a Symbol to Bits (De-)Mapper. Details of said 'soft decision' possible embodiments will be described in the next paragraphs.

For each Received Vector y we define the log-likelihood ratio (usually denoted LLR) for an event A to occur, given the reception of y, as $$L(A) = \ln[(Pr\{A|y\}/Pr\{\overline{A}|y\})] \tag{21}$$

where 'ln' denotes the natural logarithm, where $Pr\{.|.\}$ denotes (conditional) probability, where the event $\overline{A}$ denotes the event 'not-A' and where the event A is $$A = \{\text{Vector } p_a \text{ has been transmitted}\} \tag{21a}$$

if we are interested in Vector-LLR; or $$A = \{\text{Symbol } p_{ai} \text{ has been transmitted}\} \tag{21b}$$

if we are interested in Symbol-LLR; or $$A = \{\text{Bit Symbol } b_k(p_{ai}) \text{ has been transmitted}\} \tag{21c}$$

if we are interested in Bit-LLR.

Following other authors (e.g. [15]) we opt to apply to (21) above the approximation $$L(A) \cong \left[\max_{\{p|A\}}(-\|p-y\|^2) - \max_{\{p|\overline{A}\}}(-\|p-y\|^2)\right] / SNR \tag{22}$$

where the leftmost term simply defines the Euclidean (squared) distance from the Received Point y to our decision Lattice Point $p_a$, where the rightmost term defines the smallest distance of a Lattice Point p which satisfies $\overline{A}$ i.e. which its corresponding vector (or symbol, or bit) is different than that of $p_a$ itself, and where SNR is the estimated Signal to Noise Ratio for a specific realization of the Channel Matrix H as defined above.

In accordance with a preferred embodiment of this proposed invention the leftmost term of (22) above is simply the result of the Outlier Stage (equal in the great majority of cases to the result of the Descent Stage as described above); the calculation of the rightmost term of (22) is conducted in a similar manner to the fore-mentioned Descent Stage (for the calculation of $p_d$ as described above) but in the 'opposite' direction, namely, starting now from $p_a$ we calculate candidates $p+/-C_i$ (as defined above) and we select the closest that satisfies $\overline{A}$. If none is found after completing all 2M candidates we may either arbitrarily allocate some large value to this rightmost term, or continue our search from the Lattice Point adjacent to $p_a$. The complexity of said rightmost term can be readily verified to be quadratic in M for identical considerations as stated above in the context of the Descent Stage Processor.

In still other possible embodiments of the current invention it may be desirable or required to encode the information, prior to its modulation and transmission, by means of so-called Space Time Block Codes (STBC, e.g. [13], [16]); in such schemes an all-real information spatial sub-streams vector s (derived from its complex counterpart $s_c$) is linearly mapped into a 'block' or matrix X of dimension L×T so that the all-real governing equation (6) above becomes $$Y = HX + N \tag{23}$$

where Y and N are now matrices of dimension R×T with T denoting the 'temporal' dimension.

In the context of a preferred embodiment of our proposed invention it can be easily shown (e.g. [16]) that the 'block' representation (23) above is fully equivalent to the all-real, all-vector representation $$y = Hx + n \tag{24}$$

as in (6) above if we set $$H = I \otimes H \tag{25}$$

where I is the T×T identity matrix, where '$\otimes$' denotes the matrix Kronecker (or direct) product, and where H is a block diagonal RT×LT matrix. It is observed that by applying this notation the MIMO-STBC integrated scheme is reduced to our well known governing equation (6), so that (24) can be solved by means of the set of methods described in the sequel resulting in a quasi-optimal and low complexity solution.

Figure 6:
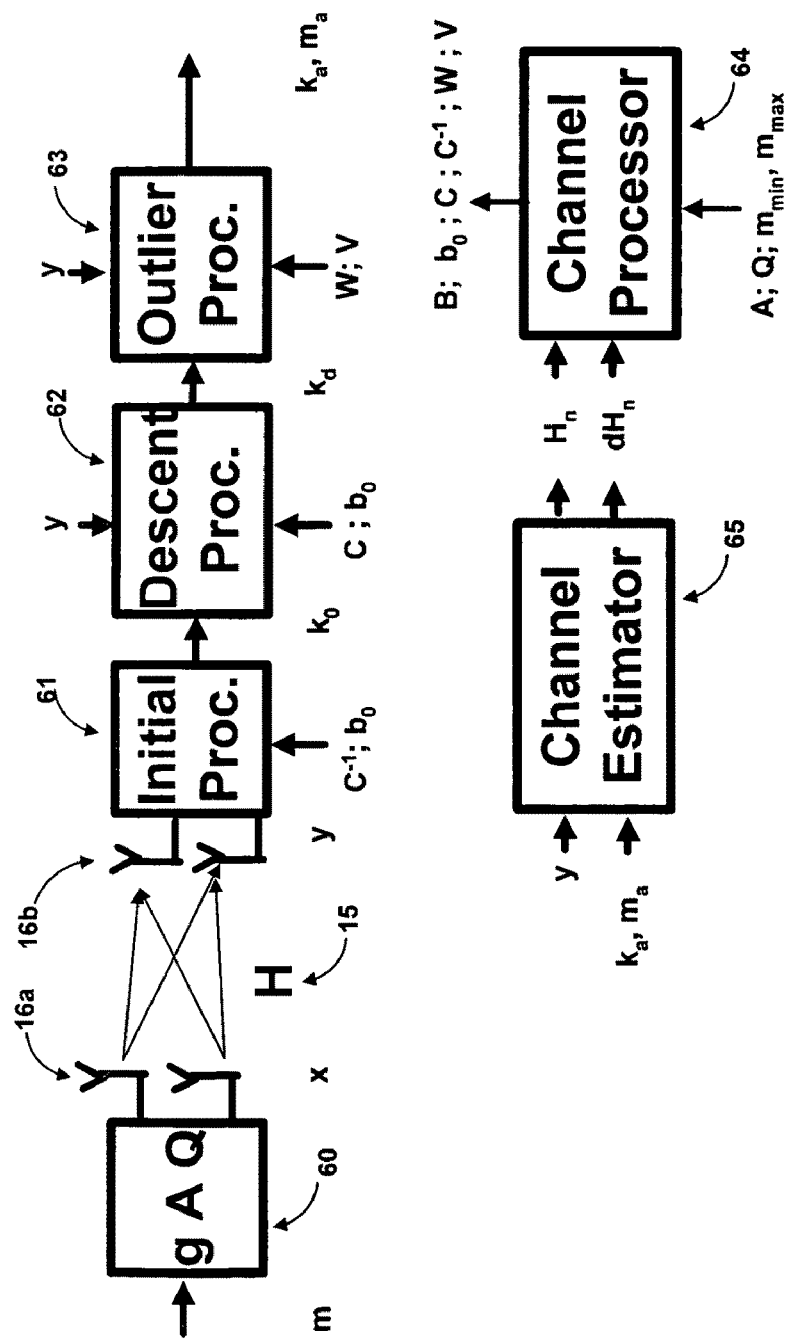
FIG. 6 presents base-band equivalent Block Diagrams of a Transmitter Device and a Receiver Device of a MIMO Wireless Communication System in accordance with a particular embodiment of the present invention.

FIG. 6 depicts a base-band equivalent Block Diagram of a MIMO Wireless Communication System comprising a Transmission Device 60 and its associated MAA 16a, a Propagation Channel 15, and a Reception Device consisting of an Initial Point Processor 61, a Descent Stage Processor 62, an Outlier Stage Processor 63, a Channel Processor 64, a Channel Estimator 65 and the Reception Device associated MAA 16b. Across the Block Diagram of FIG. 6 entities are notated in their corresponding all-real representation in accordance with (4) and (5) as described above.

All processing elements to be described in the context of FIG. 6 can be efficiently implemented by means of Digital Signal Processing hardware or software using well known techniques by those skilled in the art. Transmission and Reception Devices usually include additional physical elements and circuits such as radiating elements (Antennas), Radio Frequency (RF) Amplifiers, Frequency Translators, Analog to Digital Converters (ADCs) and Digital to Analog Converters (DACs), etc., all essential to the operation and feasibility of such devices but immaterial to the subject and ideas of this proposed invention, and therefore have been omitted from this detailed description.

The Transmission Device 60 of FIG. 6 accepts a traffic data sub-streams vector given in terms of its constellation integer coordinates m, and generates a power normalized transmission vector $x = gQ(a_0 + Am)$ in accordance with (8) and (10) above.

The transmission vector x is radiated by means of the Transmission Device 60 associated MAA 16a, propagated through the transmission (scattering, distorting and noisy) Channel 15, and received by the Reception Device associated MAA 16b, resulting in the Received Vector y=Hx+n in accordance with (6) above.

It is assumed, as is generally the case in digital Wireless Communication Systems, that data transmission is preceded by a preamble transmission during which the Reception Device Channel Estimator 65 estimates the propagation Channel H 15, resulting in a Channel Estimate $H_n$; said Channel estimation conducted by an implicit estimation method, such as LSE, MMSE or other, methods well known to those reasonably skilled in the art. It is further implicitly assumed that said Channel Estimator 65 acquires an additional set of necessary information such as average Signal Power Level, Signal Carrier Frequency and Symbol Timing, not shown in FIG. 6.

Said Channel Processor 64 of FIG. 6, following said estimation of Channel information and said other mentioned required entities (by means of Channel Estimator 65), and in accordance with a preferred embodiment of the proposed invention, proceeds to calculate some of this invention related entities including: B, the distorted Lattice Generation-Matrix; $b_0$, the distorted Lattice translation vector; C, the Reduced Basis Generator Matrix; $C^{-1}$, its inverse; and the integer matrices W and V, the fore-mentioned transforming matrix from k coordinates to m coordinates and vice versa. Said calculations are carried out with the auxiliary implicit participation of some additional information, assumed w.l.o.g. to be available at both the Reception and Transmission Devices such as: the Constellation Generator Matrix A, the (optional) unitary dimension matching matrix Q, the Constellation order, i.e. $m_{min}$ and $m_{max}$, etc.

In some possible implementations of the proposed invention it is assumed that the Channel Matrix 15 is time invariant or varies only negligibly during the transmission of a data burst; in such cases the Channel Estimator 65 estimates $H_n$ only at the beginning of said data burst (by means of e.g. training sequences as mentioned above) and delivers its result to the Channel Processor 64 as depicted in FIG. 6. In such cases no further channel estimates (sometimes called channel 'tracking' updates) are executed during the transmission of said data burst.

In some other possible implementations of this proposed invention it is assumed that the Channel Matrix 15 is not time invariant but varies (typically slightly but still significantly) during data burst transmission. In such an implementation the Channel Estimator 65 would estimate, in addition to the initial Channel Matrix $H_n$ also, after each symbol or after a (typically pre-set) N number of symbols, a Channel Matrix differential $dH_n$ as shown in 65 of FIG. 6. Such differential $dH_n$ can be estimated by several means, such as application of Decision Feedback techniques (utilizing decision variables such as $k_a$ or $m_a$ as shown in 65) or other techniques, well known to those skilled in the art, and out of the scope of the present invention.

In said time-variant implementations the Channel Processor 64 would still calculate the fore-mentioned $b_0$, B, C, $C^{-1}$, W and V entities at the beginning of a data burst as described above. In said time-variant implementations, said Channel Processor 64 will re-calculate said entities at the arrival of a new symbol by means of one of several possible methods as depicted in the following paragraphs.

In a possible embodiment of our proposed invention the Channel Processor 64 will calculate, at the arrival of a new symbol, an updated channel estimate $(H_n+dH_n/N)$, and then fully re-calculate all said entities $b_0$, B, C, $C^{-1}$, W and V. The main disadvantage of such a method would be its relatively high complexity since said calculations are now repeated at each symbol and since some of said calculations are not just quadratic in M.

In a preferred embodiment of the proposed invention the Channel Processor 64 will calculate, every N symbols, a set of vector or matrix differentials $$db_0 = dH_n \cdot a_0 \quad (26a)$$

$$dB = dH_n \cdot A \quad (26b)$$

$$dC = dB \cdot W \quad (26c)$$

the complexity of said calculation being cubic at most (for Eq. 26c) with M. Since these calculations are carried out every N symbols, by proper selection of N (e.g. N=M/2, or M, or 2M, etc) we achieve again quadratic per symbol complexity as desired.

In said preferred embodiment of our proposed invention the Channel Processor 64 will calculate, at the arrival of each new symbol, an interpolated update of fore-mentioned entities, namely $(b_0+db_0/N)$, $(B+dB/N)$ and $(C+dC/N)$, all said calculations of quadratic complexity at most.

In a preferred embodiment of the proposed invention the Channel Processor 64 will not update the inverse $C^{-1}$ which will remain fixed in time during burst transmission, slightly affecting the calculation precision of our Lattice Initial point as per (17) and (18) above.

In still other embodiments of our proposed invention the inverse $C^{-1}$ may be re-calculated at every N symbols or may be approximated at every symbol by the well known approximation $C^{-1} \cong (C^{-1} - C^{-1} \cdot W' \cdot dB/N)$ where it is implicitly assumed that $dB \approx 0$.

In accordance with a preferred embodiment of the present invention, the Initial Point Processor 61 of FIG. 6 calculates the coordinates $k_0$ of the Lattice Initial Point by means of the Rounded Parallelepiped Projection of the Received Vector y, in accordance with (17) and (18) as described above. Prior to this the Initial Point Processor 61 also executes the simple mappings required to transform complex repressentations into all-real representations (as depicted by (4) and (5) above) and optional STBC 'block' representations into all-vector representations as described by (23) to (25) above.

In further accordance with a preferred embodiment of this present invention the Descent Stage Processor 62 of the Reception Device accepts said Initial Point coordinates $k_0$, said Received Vector y, and said Channel Processor 64 results C and $b_0$, and proceeds to calculate the distance between said Received Vector y and said Initial Lattice Point as per (15) above and then iteratively calculate subsequent Lattice Points according to (16) above until arrival to a Lattice Descent Minimal Point with coordinates $k_d$ as described above.

In accordance with a preferred embodiment of the proposed invention following said $k_d$ calculation, the original Lattice Basis coordinates $m_d = Wk_d$ of said Lattice Minimum Point are calculated in the Outlier Stage Processor 63 according to (13) above, and a test regarding the residence of said Lattice Descent Minimal Point $m_d$ inside the Lattice Bounded Region (215 of FIG. 2) is carried out according to (19) as described above. In the most frequent cases whereby said Lattice Descent Minimal Point $m_d$ is found to belong to the Lattice Bounded Region as defined by (9) above then further processing by the Outlier Stage Processor 63 is not necessary. The symbol processing ends at this stage with the decision $m_a = m_d$ (and, equivalently $k_a = k_d$) as shown in 63.

In the occasional, but still not negligible, cases whereby said Lattice Descent Minimal Point $m_d$ is found to reside outside said Lattice Bounded Region, i.e. does not satisfy (9) above for at least some elements $m_{di}$ then an Outlier Stage is conducted whereby the Lattice Point closest to y but belonging to the Lattice Bounded Region is searched for. This search is conducted at the Outlier Stage Processor 63 by means of the application of any of the methods proposed in the corresponding paragraphs above, namely Constrained Lattice Descent, or Direct Search by iterative application of (19), or Integer Quadratic Programming following (20) above, or a combination thereof. The Outlier Stage symbol-vector decision result, denoted $k_a$, with its corresponding $m_a$, is then made available to the user.

In some implementations of the proposed invention the fore-mentioned 'soft-decision' scheme is desirable or required as mentioned above; for these said implementations said Outlier Stage Processor 63 calculates for each Received Vector y the corresponding Vector-LLRs (or Symbol-LLRs or Bit-LLRs) as described in (21a,b,c) and (22) above.

Figure 7:
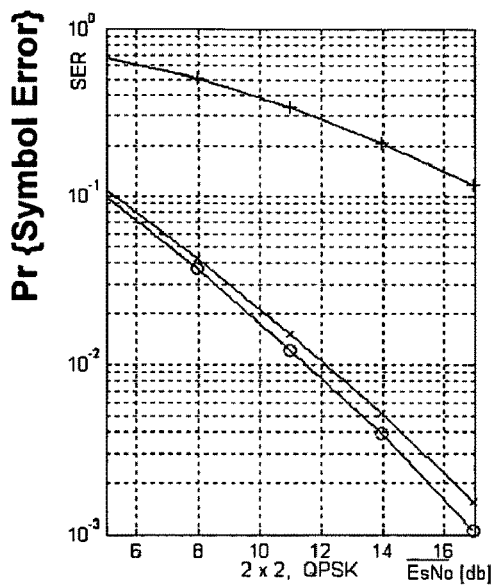
FIG. 7 shows simulated link performance results of a particular embodiment of the present invention.
Figure 7:
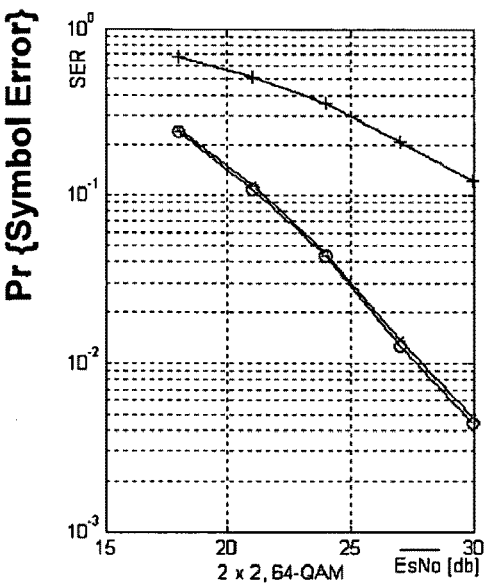
Figure 7:
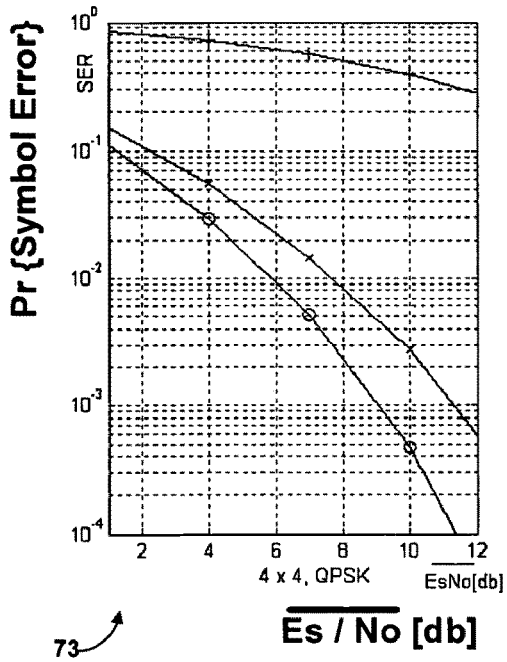
Figure 7:
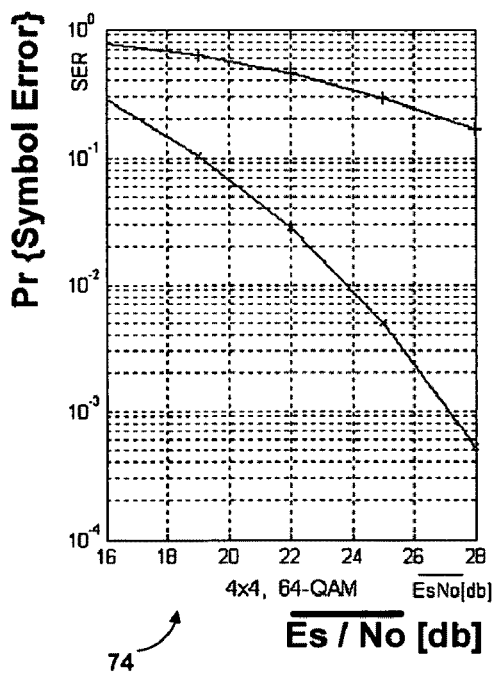

FIG. 7 presents SER vs. $\overline{Es/No}$ comparative plots, 71, 72, 73 and 74 of the simulated performance of a particular embodiment of a MIMO system implemented in accordance with the present invention, for several constellation orders and number of sub-streams. In 71 of FIG. 7 the performance of a QPSK constellation with $L_c=R_c=M_c=2$ is provided. In 72 of FIG. 7 the performance of a 64-QAM constellation with $L_c=R_c=M_c=2$ is provided. In 73 of FIG. 7 the performance of a QPSK constellation with $L_c=R_c=M_c=4$ is provided. In 74 of FIG. 7 the performance of a 64-QAM constellation with $L_c=R_c=M_c=4$ is provided. In all said plots the Symbol Error Rate of a selected data sub-stream is shown (all data sub-streams are expected to yield similar SER performance due to the symmetry of the problem).

In said plots the SER vs. $\overline{Es/No}$ performance curves achieved by MIMO systems implemented by the methods presented in this proposed invention is denoted by 'x'. For reference and comparative purpose all plots also show the SER vs. $\overline{Es/No}$ performance curves achieved by means of the fore-mentioned (naïve) Inverse Channel or Zero Force detection schemes which solve the MIMO problem in accordance with (2) above. These are denoted by '+'. In all said plots, except 74 of FIG. 7, the SER vs. $\overline{Es/No}$ performance curves of the optimal MLD method as described by (3) above are also shown, again for reference purpose, denoted by 'o'. This curve is omitted for 74 of FIG. 7 given the enormous complexity incurred (approximately 16000000 operations per symbol as mentioned above).

The enormous processing gain of our proposed method relative to the ZF reference method can be readily noticed. Our proposed method is seen to perform at quasi-optimal level (i.e. very close to the optimal MLD curves) in both 71 $\{M_c=2, QPSK\}$ and 72 $\{M_c=2, 64\text{-}QAM\}$ of FIG. 7. For greater dimensions such as in 73 $\{QPSK, M_c=4\}$ of FIG. 7 performance is also excellent, with a performance gap of only about 2 db (at SER=1E-3) relative to the optimal MLD bound.

The implementation complexity analysis of a MIMO Reception Device made in accordance with a preferred embodiment of our proposed invention can be sub-divided into a complexity analysis of the Channel Processing stage which usually takes place at the beginning of each transmission burst, implemented by means of the Channel Processor 64 of FIG. 6, and of the Symbol Processing stage, implemented by means of the Initial Point Processor 61, Descent Stage Processor 62 and Outlier Stage Processor 63 all of FIG. 6.

In a preferred embodiment the only operations executed by the Channel Processor 64 which incur greater than quadratic complexity are the computation of C, the Reduced Basis Generator Matrix and of its associated inverse $C^{-1}$. Said Reduced Basis calculation (computation of the matrix C) is known to be polynomial with the dimension of the problem (e.g. [7]). The matrix inversion calculation is known to be of cubic complexity. In any case, as mentioned above, the Channel Processing operations are usually executed only once at the beginning of each transmission burst and its effect on the overall complexity is small.

Due to its repetitive nature the Symbol Processing complexity is of major significance to the overall Reception Device average complexity. In accordance with a preferred embodiment of the current invention the calculation of the Initial Lattice Point implemented in the Initial Point Processor 61 involves a matrix-vector multiplication (as per (17) above) that scales quadratically with M, and a vector rounding operation (as per (18) above) that scales linearly with M; both are independent of the constellation order.

In further accordance with a preferred embodiment of our proposed invention the calculation of the Lattice Descent Minimal Point, carried out in the Descent Stage Processor 62, incurs the one-time calculation of the distance between the Received Vector y and the Initial Lattice Point as per (15) above, said calculation being of quadratic complexity with M and independent of the constellation order; this is followed by the iterative calculation of 2M adjacent Lattice Points (at each iteration) following (16) above, said calculation scaling up quadratically with M, as can be easily verified by inspection of (16), and again independent of the constellation order. Simulation results show that the average number of iterations involved is very close to 1, in particular when the Initial Lattice Point is calculated in accordance with our preferred embodiment method (i.e. Rounded Parallelepiped Projection) as mentioned above.

The Outlier Stage Processor 63 calculates, for every result $k_d$ of the Descent Stage Processor 62 its corresponding coordinates $m_d$ by means of (13) above and then checks for its belonging to the Lattice Bounded Region as per (9) above. This one-time calculation is quadratic in M and independent of the constellation type. An actual further activation of the Outlier Processor 63 is effected only occasionally, at those events whereby the resulting $m_d$ is found to not to belong to the Bounded Region 215 of FIG. 2. Simulation results show again, that the probability of these events is low; for example, at a typical SER=1E-3 operating point these probabilities are in the order of 3E-3 to 1E-4 for the cases $\{QPSK, M_c=2\}$ to $\{64\text{-}QAM, M_c=4\}$ as shown in 71 to 74 (as described below) of FIG. 7 respectively. Hence, in general, their average complexity impact on the Symbol Processing Stage is relatively mild. Notwithstanding with the above, and for purpose of example, the implementation of an Outlier Stage Processor 63 in accordance with the iterative Constrained Descent method as described above can be easily shown to be of similar complexity of that of the proposed Descent Stage Processor 62, namely quadratic at most with the dimension of the MIMO problem dimension M and independent of the constellation order.

Figure 8:
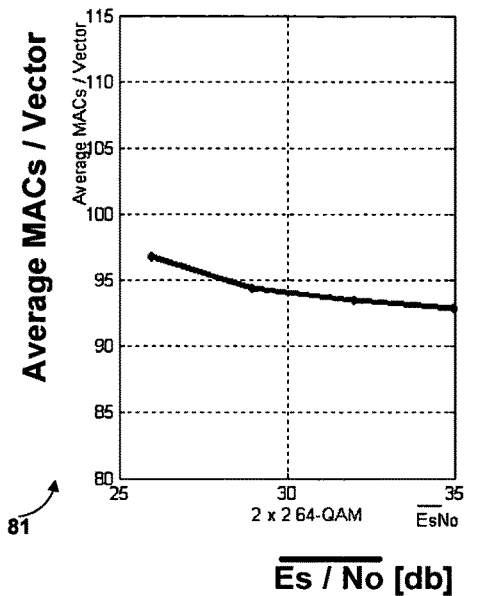
FIG. 8 shows simulated complexity results of a particular embodiment of the present invention.
Figure 8:
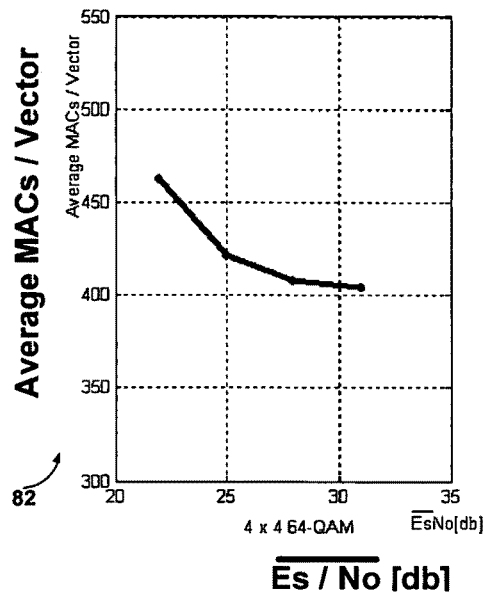
Figure 8:
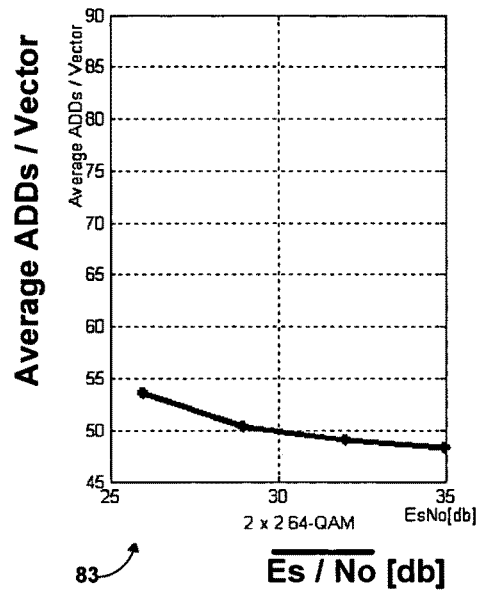
Figure 8:
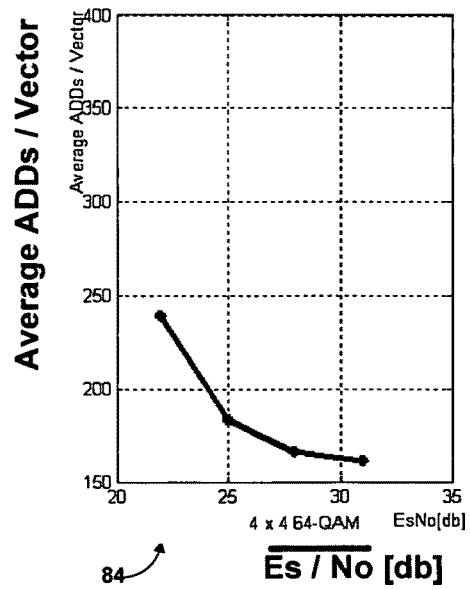

The average number of arithmetic operations (namely MACs and ADDs) required for detection of a single MIMO vector, in accordance with a particular embodiment of this proposed invention is shown in FIG. 8 for $L_c=R_c=M_c=4$ (82 and 84 of FIG. 8), and $L_c=R_c=M_c=2$ (81 and 83 of FIG. 8) 64-QAM MIMO configurations. Shown results were achieved with burst size of 50 vectors each, and they include both Channel Processor operations (as described in the context of 64 of FIG. 6) and Symbol Processing operations (carried-out-in-the-fore mentioned Initial-Point-Processor 61, Descent Stage Processor 62 and Outlier Stage Processor 63). The unprecedented low complexity can be appreciated; for example at an operating point of 27 db (corresponding approximately to 1E-3 SER) a 4×4 64-QAM Detector requires (82 of FIG. 8) about 405 MACs/Vector; since each vector carries 6×4=24 bits this reflects a complexity of about 16.9 MACs/bit. We note in addition that, for same specified operating point, the average number of MACs per vector is about 94 for $M_c=2$ vs. 405 for $M_c=4$ (a ratio of about 4.3) demonstrating that the proposed invention scales approximately quadratically with $M_c$ as advertised.

What is claimed is:

1. A method for detecting a transmitted signal vector, wherein said transmitted signal vector is detected from a signal vector received over a multiple-input multiple-output (MIMO) wireless communication channel, comprising:

providing a signal vector detector having a channel processor and a descent stage processor;

defining a reception lattice comprising a plurality of reception lattice points using said channel processor, in accordance with an estimated channel matrix, a predetermined transmitted signal constellation, and a predetermined number of data sub-streams, wherein each of said reception lattice points is describable as a linear combination of spanning vectors of said reception lattice, and wherein each member of a transmitted signal constellation corresponds to a respective reception lattice point;

traversing said reception lattice from an initial reception lattice point to a final reception lattice point using said descent stage processor, by iteratively:

obtaining, for a current reception lattice point, a set of candidate neighboring reception lattice points by moving one unit vector from said current reception lattice point in a forward direction and in a backward direction along each one of said spanning vectors, selecting from said set a neighboring reception lattice point having a smaller distance from said received signal vector than a distance between said current lattice point to said received signal vector as the current reception lattice point for a subsequent iteration, and terminating said iterative selecting when a current reception lattice point having a smaller distance from said received signal vector than respective distances of all of the neighboring lattice points in said set is obtained; and detecting said transmitted signal vector as said respective member of said transmitted signal constellation corresponding to said final reception lattice point.

2. A method according to claim 1, wherein said selecting comprises:

calculating a respective distance between said received signal vector to each one of said set of candidate neighboring reception lattice points;

determining a neighboring reception lattice point in said set having a smallest respective distance to said received signal vector;

if said smallest respective calculated distance is less than said distance between said current reception lattice point to said received signal vector, selecting said respective neighboring reception lattice point as the current reception lattice point and repeating said selecting; and if said smallest respective calculated distance is not less than said distance between said current reception lattice point to said received signal vector, establishing said current reception lattice point as said final reception lattice point and terminating said traversing said reception lattice.

3. A method according to claim 1, wherein said reception lattice points corresponding to said transmission signal constellation are contained within a reception lattice bounded region, and wherein said set of candidate neighboring reception lattice points is restricted to points within said reception lattice bounded region.

4. A method according to claim 1, further comprising selecting said spanning vectors as a basis set of vectors of said reception lattice.

5. A method according to claim 1, wherein said spanning vectors comprise a reduced basis vector set of said reception lattice.

6. A method according to claim 1, further comprising calculating said spanning vectors by applying an integer transformation to a selected basis vector set of said reception lattice.

7. A method according to claim 1, wherein said spanning vectors comprise the union of at least two spanning vector sets of said reception lattice.

8. A method according to claim 1, wherein said distance comprises a Euclidean distance.

9. A method according to claim 1, wherein said distance comprises an $l^1$-norm.

10. A method according to claim 1, wherein said distance comprises an $l^\infty$-norm.

11. A method according to claim 1, further comprising transforming said reception lattice by an inverse channel transformation, and wherein said distance comprises a Mahalanobis distance.

12. A method according to claim 1, further comprising selecting said initial reception lattice point as a rounded parallelepiped projection of said received signal vector on each of said spanning vectors.

13. A method according to claim 1, further comprising selecting said initial reception lattice point as a rounded Zero Force (ZF) transformation of said received signal vector.

14. A method according to claim 1, further comprising selecting said initial reception lattice point as a rounded Minimum Mean Square Estimate (MMSE) of said received signal vector.

15. A method according to claim 1, further comprising selecting an arbitrary reception lattice point as said initial reception lattice point.

16. A method according to claim 1, wherein said reception lattice points corresponding to said transmission signal constellation are contained within a reception lattice bounded region, and further comprising, if said final reception lattice point lies outside said reception lattice bounded region, traversing said reception lattice from said final selected reception lattice point to an interior reception lattice point, by:

establishing said final selected reception lattice point as a current outlier reception lattice point;

iteratively: obtaining, for a current reception lattice point, a set of candidate neighboring reception lattice points by moving one unit vector from said current reception lattice point in a forward direction and in a backward direction along each one of said spanning vectors, and selecting from said set a neighboring reception lattice point having a smaller distance from said reception lattice bounded region than a distance between said current outlier reception lattice point and said reception lattice bounded region as the current outlier reception lattice point for a subsequent iteration; and when a current outlier reception lattice point lies inside said reception lattice bounded region, establishing said current outlier reception lattice point as a new final selected reception lattice point and terminating said iterative selecting.

17. A method according to claim 16, further comprising:

establishing said new final selected reception lattice point as a new initial reception lattice point;

traversing said reception lattice from said new initial reception lattice point to a final reception lattice point, by iteratively: obtaining, for a current reception lattice point, a set of candidate neighboring reception lattice points by moving one unit vector from said current reception lattice point in a forward direction and in a backward direction along each one of said spanning vectors, and selecting from said set a neighboring reception lattice point having a smaller distance from said received signal vector than a distance between said current lattice point to said received signal vector as the current reception lattice point for a subsequent iteration, wherein said neighboring reception lattice points are restricted to points within said reception lattice bounded region; and detecting said transmitted signal vector as said respective member of said transmitted signal constellation corresponding to said final reception lattice point.

18. A method according to claim 1, wherein said reception lattice points corresponding to said transmission signal constellation are contained within a reception lattice bounded region, and further comprising, if said final reception lattice point lies outside said reception lattice bounded region, obtaining a reception lattice point within said reception lattice bounded region by solving an Integer Quadratic Programming (IQP) formulation.

19. A method according to claim 1, further comprising providing a level of reliability of said detection.

20. A method according to claim 19, wherein said providing a level of reliability of said detection is in accordance with a set of said neighboring reception lattice points.

21. A method according to claim 19, wherein said providing a level of reliability of said detection comprises calculating a log-likelihood ratio.

22. A method according to claim 1, further comprising wherein said defining a reception lattice comprises converting a MIMO Space Time Block Coded (MIMO-STBC) reception block matrix into said reception lattice, and further comprising converting a received signal block-matrix into said received signal vector.

23. A method according to claim 22, wherein said converting a MIMO Space Time Block Coded (MIMO-STBC) reception block matrix into said reception lattice and said converting a received signal block-matrix into said received signal vector are performed prior to said traversing.

24. A signal vector detector, for detecting a transmitted signal vector from a signal vector received over a multiple-input multiple-output (MIMO) wireless communication channel, comprising:
 a channel processor, configured for defining a reception lattice comprising a plurality of reception lattice points, in accordance with an estimated channel matrix a predetermined transmitted signal constellation, and a predetermined number of data sub-streams, wherein each of said reception lattice points is described as a linear combination of spanning vectors of said reception lattice and wherein each member of a transmitted signal constellation corresponds to a respective reception lattice point, and for calculating at least one reception lattice spanning vector set, in accordance with an estimated channel matrix;
 an initial point processor, configured for selecting an initial reception lattice point;
 a descent stage processor associated with said channel processor and said initial point processor, configured for traversing a reception lattice from said initial reception lattice point to a final reception lattice point, by iteratively: obtaining, for a current reception lattice point, a set of candidate neighboring reception lattice points by moving one unit vector from said current reception lattice point in a forward direction and in a backward direction along each one of said spanning vectors, selecting from said set a neighboring reception lattice point having a smaller distance from said received signal vector than a distance between said current lattice point to said received signal vector as the current reception lattice point for a subsequent iteration, and terminating said iterative selecting when a current reception lattice point having a smaller distance from said received signal vector than respective distances of all of the neighboring lattice points is obtained, and for detecting said transmitted signal vector as said respective member of said transmitted signal constellation corresponding to said final reception lattice point.

25. A signal vector detector according to claim 24, wherein said spanning vectors comprise a first basis set of said reception lattice.

26. A signal vector detector according to claim 25, wherein said channel processor is further configured for calculating at least a second basis set and at least one integer transformation matrix.

27. A signal vector detector according to claim 26, further comprising an outlier processor configured for transforming said final reception lattice point from said first basis set into a said second basis set of vectors of said reception lattice using said integer transformation matrix.

28. A signal vector detector according to claim 27, wherein a set of reception lattice points corresponding to said transmission signal constellation is contained within a reception lattice bounded region, and wherein said outlier processor is further configured for determining if said final reception lattice point resides within said reception lattice bounded region using said transformed final reception lattice point.

29. A signal vector detector according to claim 24, wherein said channel processor is further configured for periodically recalculating said reception lattice spanning vector sets in accordance with channel matrix estimate updates.

30. A signal vector detector according to claim 24, wherein said initial point processor is further configured to calculate said initial reception lattice point by a rounded parallelepiped projection of said received signal vector on each of said spanning vectors.

31. A signal vector detector according to claim 24, wherein said descent stage processor is further configured to calculate a respective distance between said received signal vector to each of said neighboring reception lattice points in said set;
 determine a neighboring reception lattice point in said set having a smallest respective distance to said received signal vector;
 select, if said smallest respective calculated distance is less than said distance between said current reception lattice point to said received signal vector, said respective neighboring reception lattice point as the current reception lattice point, and repeat said selection; and
 establish, if said smallest respective calculated distance is not less than said distance between said current reception lattice point to said received signal vector, said current reception lattice point as said final reception lattice point, and terminate said traversing said reception lattice.

32. A signal vector detector according to claim 24, wherein a set of reception lattice points corresponding to said transmitted signal constellation is contained within a reception lattice bounded region, and frrther comprising an outlier processor configured for ensuring that said final reception lattice point resides within said reception lattice bounded region.

33. A signal vector detector according to claim 32, wherein said outlier processor is configured for establishing said final selected reception lattice point as a new initial reception lattice point, for traversing said reception lattice from said new initial reception lattice point to a final reception lattice point, by iteratively: obtaining, for a current reception lattice point, a set of candidate neighboring reception lattice points by moving one unit vector from said current reception lattice point in a forward direction and in a backward direction along each one of said spanning vectors, and selecting, for a current reception lattice point, a neighboring reception lattice point from said set having a smaller distance from said received signal vector than the distance between said current lattice point to said received signal vector as the current reception lattice point for a subsequent iteration, wherein said set of candidate neighboring reception lattice points are restricted to points within said reception lattice bounded region, and for detecting said transmitted signal vector as said respective member of said transmitted signal constellation corresponding to said final reception lattice point.

34. A signal vector detector according to claim 24, further comprising a reliability estimator configured for calculating a level of reliability of said detection.

35. A signal vector detector according to claim 24, wherein said channel processor is configured for converting a MIMO Space Time Block Coded (MIMO-STBC) reception block matrix into said reception lattice, and for converting a received signal block-matrix into said received signal vector.

36. A method for detecting a transmitted signal vector, wherein said transmitted signal vector is detected from a signal vector received over a multiple-input multiple-output (MIMO) wireless communication channel, comprising:

defining a reception lattice comprising a plurality of reception lattice points, in accordance with an estimated channel matrix, a predetermined transmitted signal constellation, and a predetermined number of data sub-streams, wherein each of said reception lattice points is describable as a linear combination of spanning vectors of said reception lattice, and wherein each member of a transmitted signal constellation corresponds to a respective reception lattice point;

inputting a signal vector received over said MIMO wireless communication channel;

determining an initial reception lattice point from said received signal vector;

traversing said reception lattice from said initial reception lattice point to a final reception lattice point, by iteratively:

obtaining, for a current reception lattice point, a set of candidate neighboring reception lattice points by moving one unit vector from said current reception lattice point in a forward direction and in a backward direction along each one of said spanning vectors, selecting from said set a neighboring reception lattice point having a smaller distance from said received signal vector than a distance between said current lattice point to said received signal vector as the current reception lattice point for a subsequent iteration, and terminating said iterative selecting when a current reception lattice point having a smaller distance from said received signal vector than respective distances of all of the neighboring lattice points in said set is obtained; and detecting said transmitted signal vector as said respective member of said transmitted signal constellation corresponding to said final reception lattice point; and outputting said detected transmitted signal vector, thereby transforming said received signal vector into a detected signal vector.

* * * * *